(12) United States Patent
Matsui

(10) Patent No.: US 10,062,021 B2
(45) Date of Patent: Aug. 28, 2018

(54) IMAGE PROCESSING APPARATUS, INFORMATION PROCESSING METHOD AND STORAGE MEDIUM

(71) Applicant: CANON KABUSHIKI KAISHA, Tokyo (JP)

(72) Inventor: Kenta Matsui, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/388,317

(22) Filed: Dec. 22, 2016

(65) Prior Publication Data

US 2017/0160994 A1    Jun. 8, 2017

Related U.S. Application Data

(62) Division of application No. 14/800,298, filed on Jul. 15, 2015, now Pat. No. 9,569,808.

(30) Foreign Application Priority Data

Jul. 24, 2014   (JP) ................................. 2014-150710

(51) Int. Cl.
   *G06F 3/12* (2006.01)
   *G06K 15/02* (2006.01)
   (Continued)

(52) U.S. Cl.
   CPC ....... *G06K 15/1857* (2013.01); *G06K 15/181* (2013.01); *G06K 15/1822* (2013.01);
   (Continued)

(58) Field of Classification Search
   None
   See application file for complete search history.

(56) References Cited

U.S. PATENT DOCUMENTS 6,559,958 B2 * 5/2003 Motamed ........... G06K 15/1857
                                                    358/1.13
6,804,028 B1   10/2004 Fukuta
(Continued)

FOREIGN PATENT DOCUMENTS

CN   102200896 A   9/2011
JP   2009-214348 A  9/2009
(Continued)

OTHER PUBLICATIONS

Chinese Office Action dated Nov. 1, 2017, in related Chinese Patent Application No. 201510427471.5 (with English translation).
(Continued)

*Primary Examiner* — Dung D Tran
(74) *Attorney, Agent, or Firm* — Fitzpatrick, Cella, Harper & Scinto

(57) ABSTRACT

A printing apparatus is provided with a plurality of analyzing units, and a control unit. Each of the plurality of analyzing units analyzes each of different pages of print data, and notifies an error in a case that an analysis error occurs. The control unit receives the error notification from the analyzing unit, at which the analysis error occurs, among the plurality of analyzing units. And, the control unit notifies a cancel to another analyzing unit at which the analysis error does not occur. The control unit is further configured to notify, on a condition that a printing of all pages before a page at which the analysis error occurs is completed, the cancel to the another analyzing unit.

20 Claims, 12 Drawing Sheets

(51) Int. Cl.
*G06K 15/00* (2006.01)
*G06T 1/00* (2006.01)

(52) U.S. Cl.
CPC ....... *G06K 15/1848* (2013.01); *G06K 15/408* (2013.01); *G06T 1/00* (2013.01)

(56) References Cited

U.S. PATENT DOCUMENTS

| | | | |
|---|---|---|---|
| 6,967,743 B1 | 11/2005 | Kumazawa | |
| 8,213,031 B2 | 7/2012 | Kim | |
| 8,665,458 B2 | 3/2014 | Ozawa | |
| 8,675,212 B2 | 3/2014 | Akiyama | |
| 8,705,095 B2 | 4/2014 | Miyazaki | |
| 8,736,876 B2 * | 5/2014 | Hayakawa | G06F 3/1211 358/1.14 |
| 8,767,247 B2 * | 7/2014 | Ozawa | G06K 15/1861 358/1.13 |
| 8,928,912 B2 | 1/2015 | Misawa | |
| 8,976,373 B2 | 3/2015 | Nogawa | |
| 2007/0188796 A1 | 8/2007 | Saito | |
| 2007/0223027 A1 | 9/2007 | Shindo | |
| 2010/0079808 A1 | 4/2010 | Mitzutani | |
| 2011/0255120 A1 | 10/2011 | Hirahara | |
| 2011/0279847 A1 | 11/2011 | Kakoi et al. | |
| 2012/0133984 A1 * | 5/2012 | Hayakawa | G06F 3/1211 358/1.16 |
| 2012/0224208 A1 | 9/2012 | Tokumoto | |
| 2012/0314240 A1 * | 12/2012 | Randell | G06F 3/1213 358/1.14 |
| 2014/0104642 A1 | 4/2014 | Sugawara | |
| 2014/0168700 A1 | 6/2014 | Araya | |
| 2015/0015904 A1 | 1/2015 | Seko | |
| 2016/0077767 A1 * | 3/2016 | Yamamoto | G06F 3/121 358/1.14 |

FOREIGN PATENT DOCUMENTS

| | | |
|---|---|---|
| JP | 2011-183757 | 9/2011 |
| JP | 2012-059093 A | 3/2012 |

OTHER PUBLICATIONS

Japanese Office Action dated Jun. 5, 2018, in related Japanese Patent Application No. 2016-135248.

* cited by examiner

IMAGE PROCESSING APPARATUS, INFORMATION PROCESSING METHOD AND STORAGE MEDIUM

This application is a divisional of U.S. application Ser. No. 14/800,298, filed on Jul. 15, 2015, which claims priority to Japan 2014-150710, filed on Jul. 24, 2014, the contents of each of which are incorporated by reference.

BACKGROUND OF THE INVENTION

Field of the Invention

The present invention relates to an image processing technology which can perform appropriate processing according to an error, even when a plurality of analyzing units has been applied to the analysis processing of print data.

Description of the Related Art

A printing apparatus receives print data referred to as PDL (Page Description Language), analyzes the received print data, generates a bitmapped image in which a character and/or a figure are drawn, and performs print processing. If there is unknown data or the like in the print data, an error occurs in analysis processing, and the print processing after the error is canceled.

Conventionally, the analysis processing of print data has been executed by a CPU of a single core (processor having one core). At this time, the print data is analyzed in order of page, and the processing is suspended when an error has occurred. Accordingly, papers of the pages for which processing has ended are ejected (print result is output).

In recent years, a CPU of a multi-core (processor having a plurality of cores) has appeared, and the multi-core CPU is adopted for the enhancement of throughput in various fields. Japanese Patent Application Laid-Open No. 2011-183757 discloses that the multi-core is applied also to the analysis processing of print data.

In the case where the multi-core is applied to the analysis processing of the print data, if a plurality of pages is simultaneously analyzed by a plurality of cores, and the processing is suspended when the error has occurred, the page which would have been output in the conventional printing apparatus may not be output, and appropriate processing according to the error becomes necessary.

SUMMARY OF THE INVENTION

According to an aspect of the present invention, a printing apparatus comprises: a plurality of analyzing units, each configured to analyze each of different pages of print data and to notify an error in a case that an analysis error occurs; a control unit configured to receive the error notification from the analyzing unit, at which the analysis error occurs, among the plurality of analyzing units, and to notify a cancel to another analyzing unit at which the analysis error does not occur, wherein the control unit is further configured to notify, on a condition that a printing of all pages before a page at which the analysis error occurs is completed, the cancel to the another analyzing unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Figure 1:
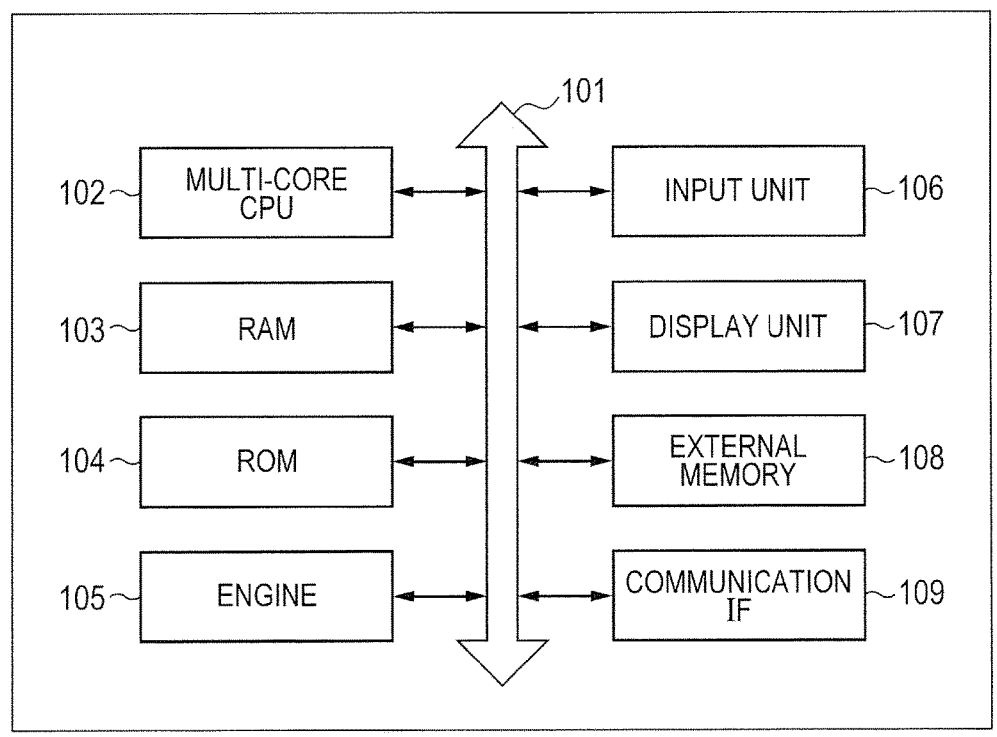
FIG. 1 is a view illustrating one example of a hardware configuration of a printing apparatus.

FIG. 1 is a view illustrating one example of a hardware configuration of a printing apparatus. The printing apparatus is one example of the image processing apparatus.

In the printing apparatus, a multi-core CPU 102, a RAM 103, a ROM 104, an engine 105, an input unit 106, a display unit 107, an external memory 108 and a communication IF 109 are connected to each other through a system bus 101. Each of the units which are connected to the system bus 101 is configured so as to be capable of transmitting and receiving data between each other, through the system bus 101.

The ROM 104 is a non-volatile memory, and various programs and the like for operating the multi-core CPU 102 are stored in predetermined regions, respectively.

The RAM 103 is a volatile memory, and is used as a temporary storage region such as a main memory and a work area of the multi-core CPU 102.

The multi-core CPU 102 is a multi-core processor, and controls each of the units of the printing apparatus while using the RAM 103 as a work memory, for instance, according to a program stored in the ROM 104. The program is not necessarily stored in the ROM 104, but may be previously stored in the external memory 108 such as a hard disk.

The input unit 106 receives a user operation, generates a control signal according to the operation, and supplies the generated control signal to the multi-core CPU 102. The multi-core CPU 102 controls each of the units of the printing apparatus according to the program, based on the control signal which is supplied from the input unit 106.

The display unit 107 displays a GUI screen for the user, based on a display control signal which the multi-core CPU 102 generates.

An external memory such as the hard disk and a memory card can be mounted on the external memory 108. The data is read out from and written in the mounted external memory 108, based on the control of the multi-core CPU 102. The communication IF 109 performs communication with various networks such as a wired network and a wireless network, based on the control of the multi-core CPU 102.

The engine 105 outputs a bitmapped image which the multi-core CPU 102 has generated according to the program, to a print medium.

The multi-core CPU 102 executes processing based on the program which is memorized in the ROM 104 or the external memory 108, and thereby a software configuration of the printing apparatus and the processing of a flow chart are achieved which will be described later.

Figure 2:
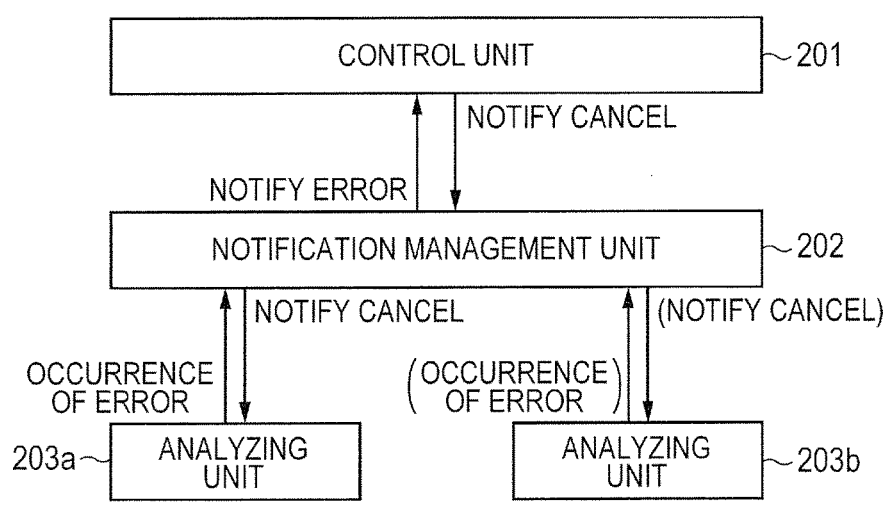
FIG. 2 is a view illustrating one example of a software configuration for analyzing the print data of the printing apparatus.

FIG. 2 is a view illustrating one example of a software configuration for analyzing the print data of the printing apparatus.

The control unit 201 controls the whole print processing in a period after having received the print data until printing the print data.

A notification management unit 202 is positioned between the control unit 201 and analyzing units 203a and 203b, and acts as a liaison between the units. The notification management unit 202 detects an error occurring in the analyzing unit 203a or 203b, and notifies the control unit 201 of the error. In addition, the notification management unit 202 notifies both of the analyzing units 203a and 203b of a cancel notification which the control unit 201 outputs after having received the error notification.

The analyzing units 203a and 203b analyze the print data. In the present embodiment, the multi-core CPU shall execute these software modules, the analyzing unit 203a shall analyze odd pages of the print data, and the analyzing unit 203b shall analyze even pages of the print data. When having received the cancel notification, the analyzing units 203a and 203b stop analysis processing.

Cancel processing in the case where the error has occurred during an analysis of the print data, in such a software configuration, will be described below with reference to flow charts in FIGS. 3, 4 and 5.

Figure 3:
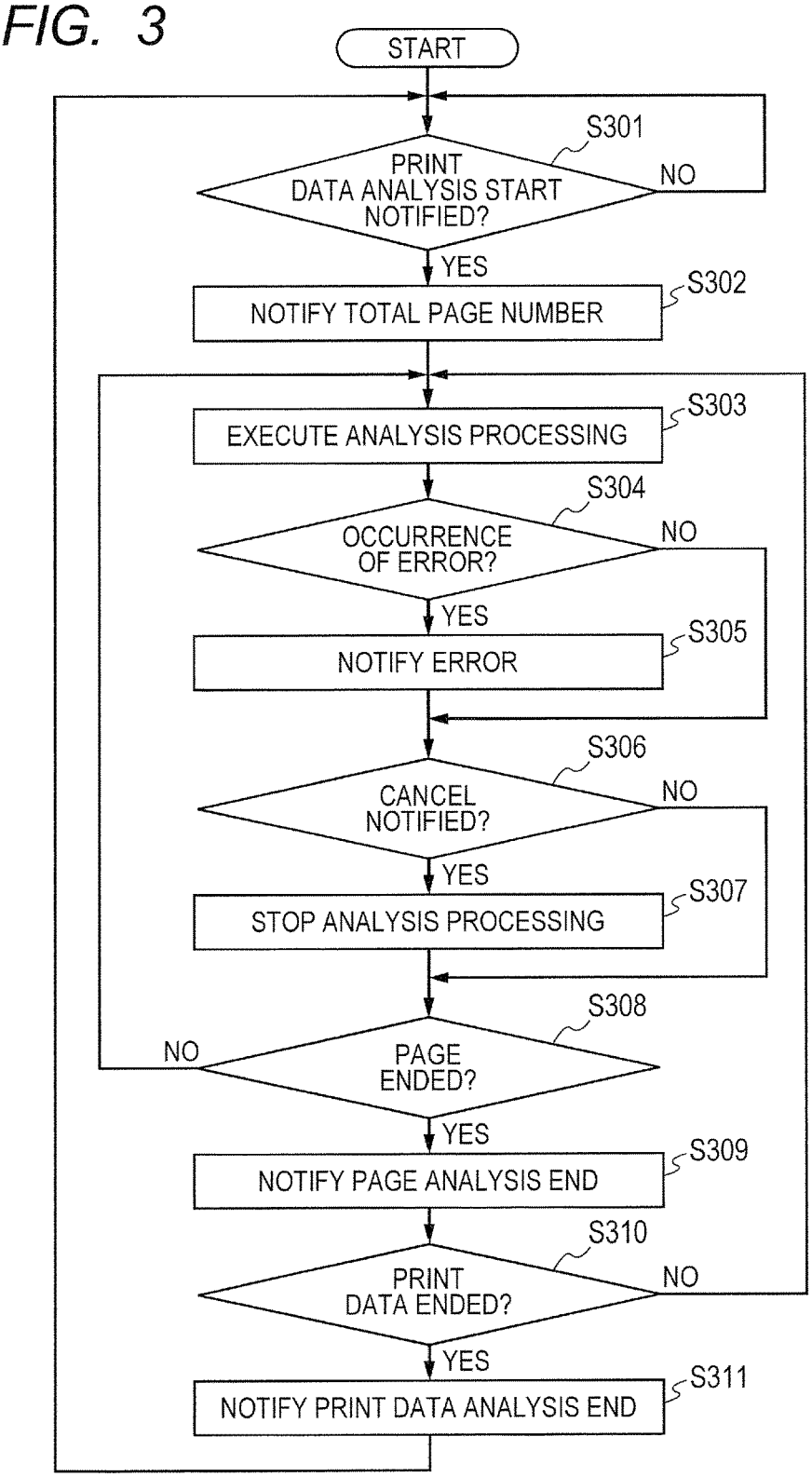
FIG. 3 is a flow chart which illustrates the information processing of an analyzing unit.

FIG. 3 is a flow chart illustrating the information processing of the analyzing unit (203a or 203b).

In a step S301, the analyzing unit checks whether there is a notification of a print data analysis start from the notification management unit 202. The control unit 201 which receives the print data notifies the notification management unit 202 of the print data analysis start, and the notification management unit 202 which has received the notification notifies the analyzing unit of the print data analysis start. When there is the notification of the print data analysis start, the analyzing unit progresses to the processing of a step S302. When there is not the notification of the print data analysis start, the analyzing unit repeats the processing of the step S301.

In the step S302, the analyzing unit notifies the notification management unit 202 of the total page number of the print data.

In a step S303, the analyzing unit starts the analysis processing of the print data.

In a step S304, the analyzing unit checks whether the error has occurred during the analysis processing of the print data. When the error has occurred, the analyzing unit progresses to the processing of a step S305. When the error has not occurred, the analyzing unit progresses to the processing of a step S306.

In the step S305, the analyzing unit notifies the notification management unit 202 of the occurrence of the error.

In the step S306, the analyzing unit checks whether there is a cancel notification from the notification management unit 202. When there is the cancel notification, the analyzing unit progresses to the processing of a step S307. When there is not the notification of the cancel, the analyzing unit progresses to the processing of a step S308.

In the step S307, the analyzing unit stops the analysis processing.

In the step S308, the analyzing unit checks whether the analysis processing for one page has ended. When the analysis processing for one page has ended, the analyzing unit progresses to the processing of a step S309. When the analysis processing for one page has not ended, the analyzing unit returns to the processing of the step S303, and continues the analysis processing.

In the step S309, the analyzing unit notifies the notification management unit 202 of an end of the analysis processing for one page.

In a step S310, the analyzing unit checks whether the analysis processing for all of the print data has ended. When the analysis processing has ended, the analyzing unit progresses to the processing of a step S311. When the analysis processing has not ended, the analyzing unit returns to the processing of the step S303, and continues the analysis processing.

In the step S311, the analyzing unit notifies the notification management unit 202 of the end of the analysis of the print data.

Figure 4:
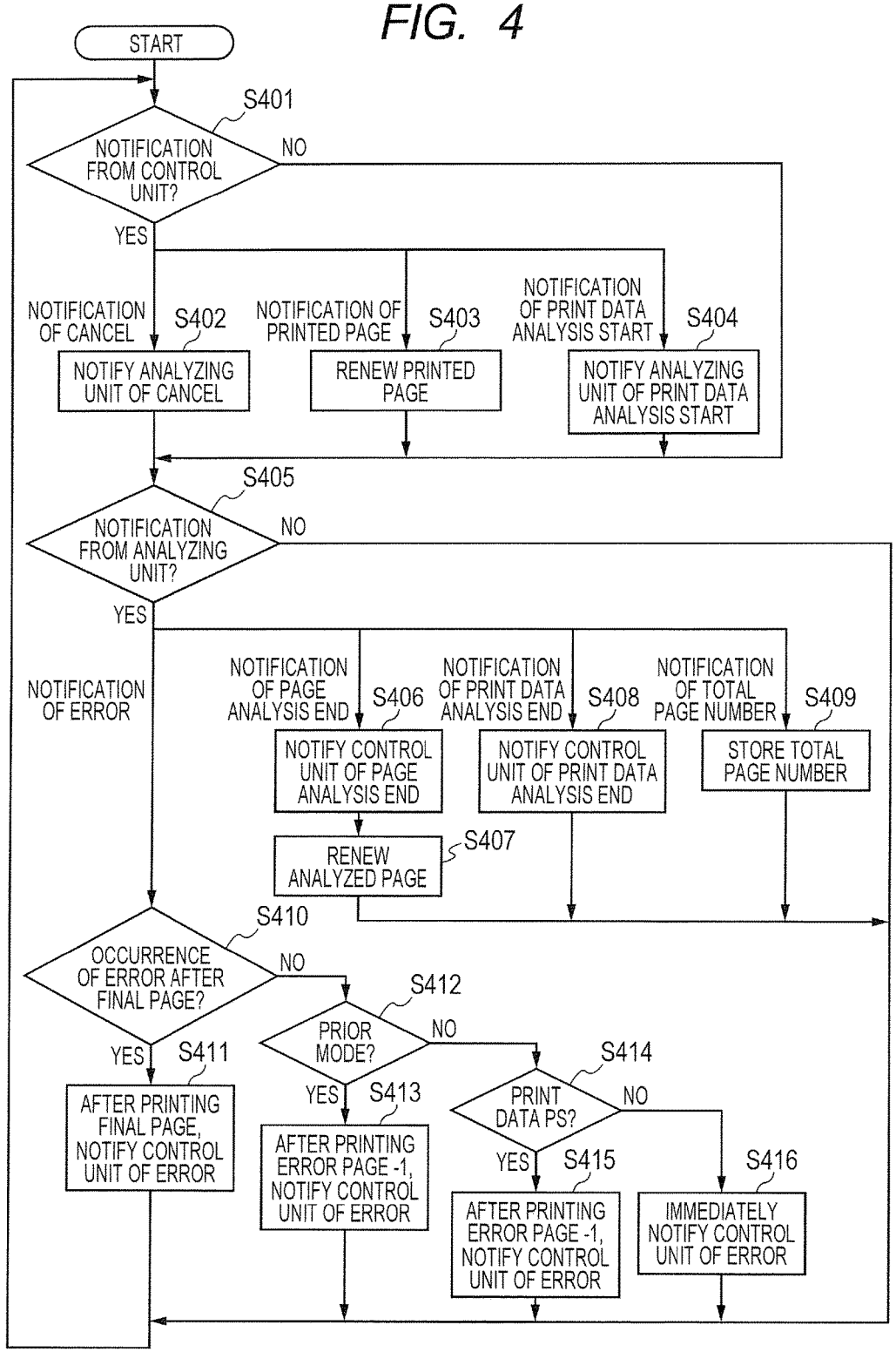
FIG. 4 is a flow chart which illustrates the information processing of a notification management unit.
Figure 5:
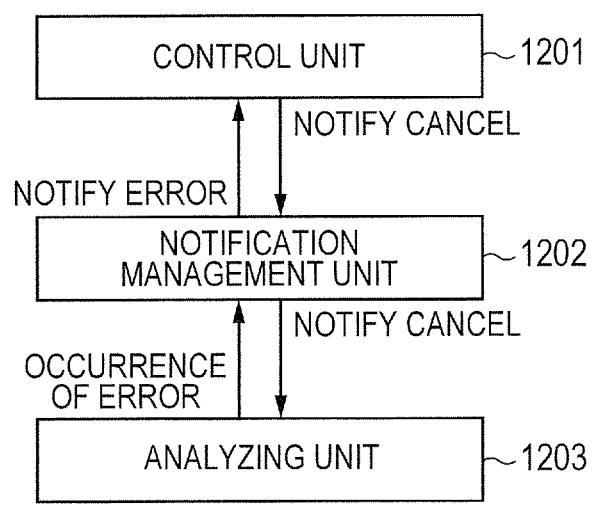
FIG. 5 is a view illustrating the software configuration of a printing apparatus which performs analysis processing by a single core.

FIG. 4 is a flow chart which illustrates the information processing of the notification management unit 202.

In a step S401, the notification management unit 202 checks whether there is a notification sent from the control unit 201. When there is the notification of the cancel, the notification management unit 202 progresses to the processing of a step S402. When there is a notification of a printed page, which indicates a page that has been printed out, the notification management unit 202 progresses to the processing of a step S403. When there is a notification of a print data analysis start, the notification management unit 202 progresses to the processing of a step S404. Incidentally, the printed page may be such a page that the generation of a bitmapped image (drawing processing) for one page to be printed has been completed. In addition, when there is no notification sent from the control unit 201, the notification management unit 202 progresses to the processing of a step S405.

In the step S402, the notification management unit 202 notifies the analyzing units 203a and 203b of the cancel of the analysis processing.

In the step S403, the notification management unit 202 renews a value of the printed page, which the notification management unit 202 stores in itself.

In the step S404, the notification management unit 202 notifies the analyzing units 203a and 203b of the print data analysis start.

In the step S405, the notification management unit 202 checks whether there is a notification sent from the analyzing units 203a and/or 203b. When there is the notification of the error, the notification management unit 202 progresses to the processing of a step S410. When there is a notification of a page analysis end, the notification management unit 202 progresses to the processing of a step S406. When there is a notification of a print data analysis end, the notification management unit 202 progresses to the processing of a step S408. When there is a notification of the total page number, the notification management unit 202 progresses to the processing of a step S409. When there is no notification sent from the analyzing units 203a and 203b, the notification management unit 202 returns to the processing of the step S401.

In the step S406, the notification management unit 202 notifies the control unit 201 of the page analysis end.

In the step S407, the notification management unit 202 renews a value of the analyzed page, which the notification management unit 202 stores in itself.

In the step S408, the notification management unit 202 notifies the control unit 201 of the print data analysis end.

In the step S409, the notification management unit 202 stores a value of the total page number of the print data.

In the step S410, the notification management unit 202 checks whether the error notification concerns an error having occurred after the final page (after final page has been analyzed). When the values of the analyzed page which the notification management unit 202 stores therein and the total page number are equal at the timing at which the error has been notified, the notification management unit 202 determines that the error notification concerns the error having occurred after the final page. When the error notification concerns the error having occurred after the final page, the notification management unit 202 progresses to the processing of a step S411. When the notification does not concern the error, the notification management unit 202 progresses to the processing of a step S412.

In the step 411, the notification management unit 202 notifies the control unit of the error, after the final page has been printed. Incidentally, when the values of the printed page which is stored and the total page number are equal, the notification management unit 202 determines that all pages to the final page have been printed.

In the step S412, the notification management unit 202 checks whether the conventional mode is turned ON (ON) or OFF (OFF), which the notification management unit 202 stores in itself.

When the conventional mode is turned ON, the printing is required which shows the same result as that of a conventional printing apparatus that performs the analysis processing of the print data by a single core. FIG. 5 is a view illustrating one example of a software configuration of a printing apparatus which performs the analysis processing by the single core. In FIG. 5, software modules 1201-1203 correspond to the control unit 201, the notification unit 202 and the analyzing unit (203a, 203b), respectively, of FIG. 2.

The value for the conventional mode (for instance, 1 for ON and 0 for OFF, or the like) shall be previously designated by a user. When the value for the conventional mode is turned ON, the notification management unit 202 progresses to the processing of a step S413. When the value is not turned ON, the notification management unit 202 progresses to the processing of a step S414.

Incidentally, the multi-core CPU 102 may be configured to switch between ON and OFF of the conventional mode, according to a user operation through the input unit 106 or the like. The above description is the same also in an embodiment which will be described later.

In the step S413, the notification management unit 202 checks whether the page which is one page prior to the error occurring page has been printed, with reference to the value of the printed page, which the notification management unit 202 stores in itself, and then notifies the control unit 201 of the error.

In the step S414, the notification management unit 202 checks the kind of the print data for which the analysis processing is being performed. When the print data is the data of a previously set form (for instance, PS (Post Script (registered trademark)), the notification management unit 202 progresses to the processing of a step S415. When the print data is not data of the previously set form, the notification management unit 202 progresses to the processing of a step S416.

In the step S415, the notification management unit 202 checks that the page which is one page prior to the error occurring page has been printed, with reference to the value of the printed page, which the notification management unit 202 stores in itself, and then notifies the control unit 201 of the error. When the print data is the PS, all the pages to the page of the specification, in which the error occurs, need to be printed, and such a response becomes necessary.

In the step S416, the notification management unit 202 notifies the control unit 201 of the error.

Figure 6:
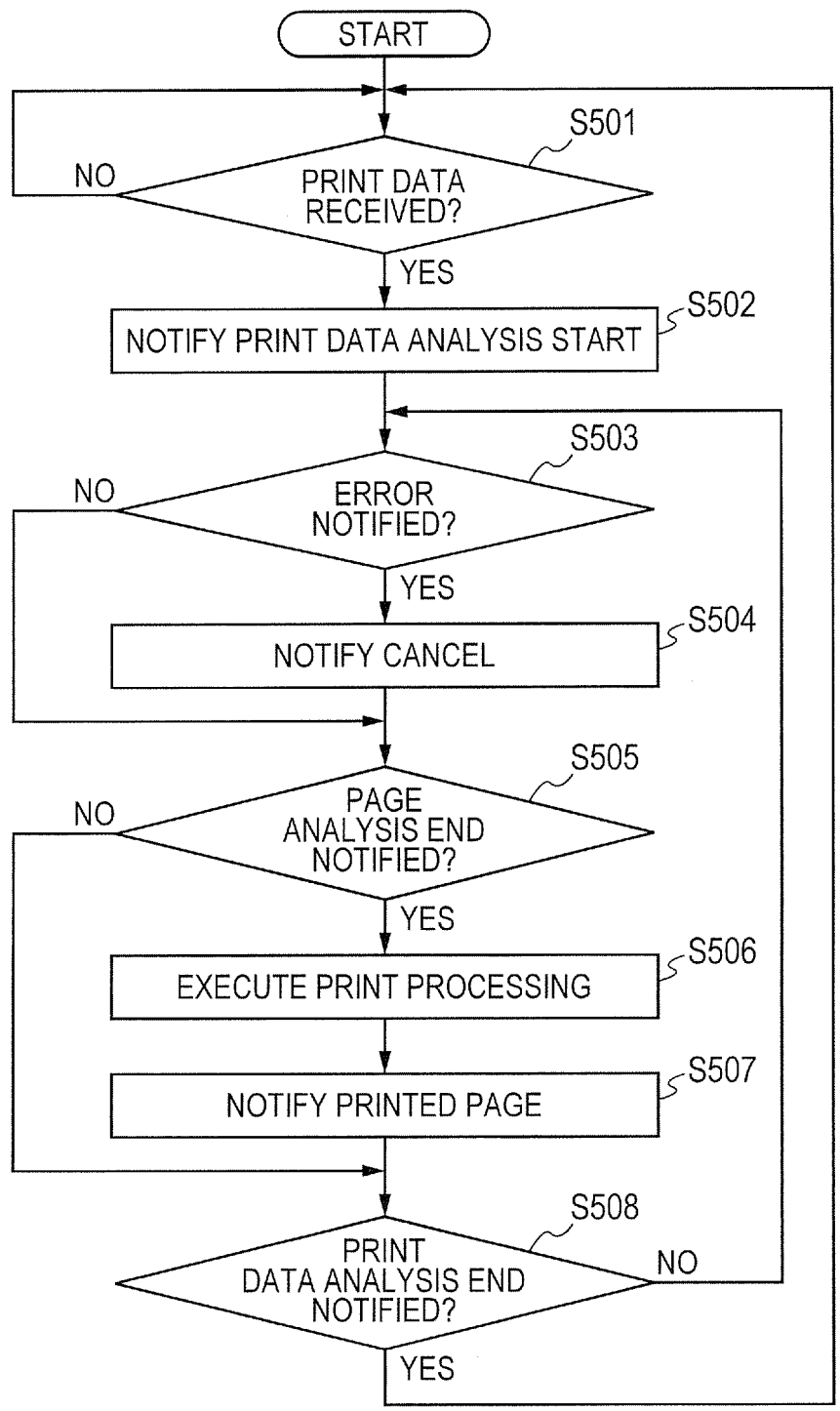
FIG. 6 is a flow chart which illustrates the information processing of a control unit.

FIG. 6 is a flow chart which illustrates the information processing of the control unit 201.

In a step S501, the control unit 201 checks whether having received the print data. When having received the print data, the control unit 201 progresses to the processing of a step S502. When not having received the print data, the control unit 201 repeats the processing of the step S501.

In the step S502, the control unit 201 notifies the notification management unit 202 of the print data analysis start.

In a step S503, the control unit 201 checks whether error notification is sent from the notification management unit 202. When the error notification is sent, the control unit 201 progresses to the processing of a step S504. When the error notification is not sent, the control unit 201 progresses to the processing of a step S505.

In the step S504, the control unit 201 notifies the notification management unit 202 of cancel.

In a step S505, the control unit 201 checks whether a notification of a page analysis end is sent from the notification management unit 202. When the notification of the page analysis end is sent, the control unit 201 progresses to the processing of a step S506. When the notification of the page analysis end is not sent, the control unit 201 progresses to the processing of a step S508.

In the step S506, the control unit 201 executes the print processing for the page of which the page analysis end has been notified.

In a step S507, the control unit 201 notifies the notification management unit 202 of a page which has been printed, as the printed page.

In the step S508, the control unit 201 checks whether the notification of the print data analysis end is sent from the notification management unit 202. When the notification of the print data analysis end is sent, the control unit 201 progresses to the processing of the step S501. When the notification of the print data analysis end is not sent, the control unit 201 progresses to the processing of the step S503.

Figure 7A:
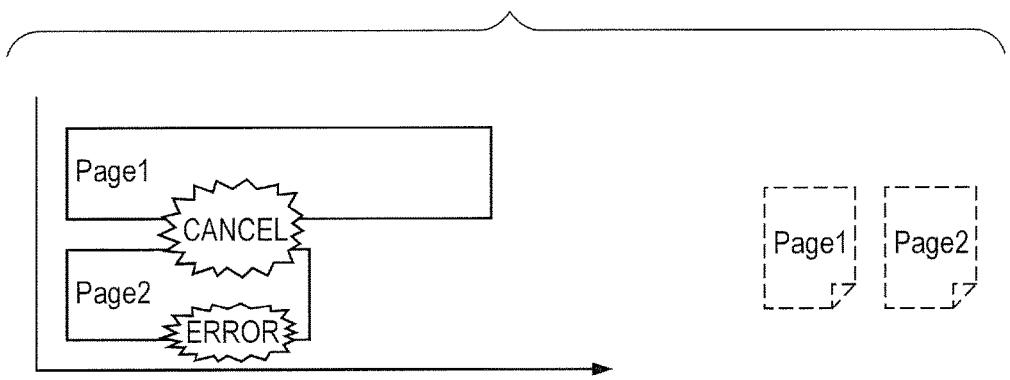
FIGS. 7A, 7B and 7C are views illustrating one example of the processing which prints the print data of 2 pages.
Figure 7B:
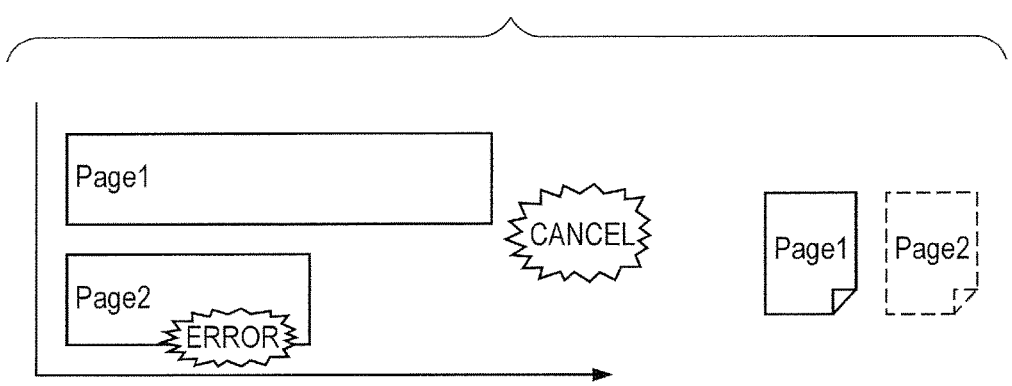
Figure 7C:
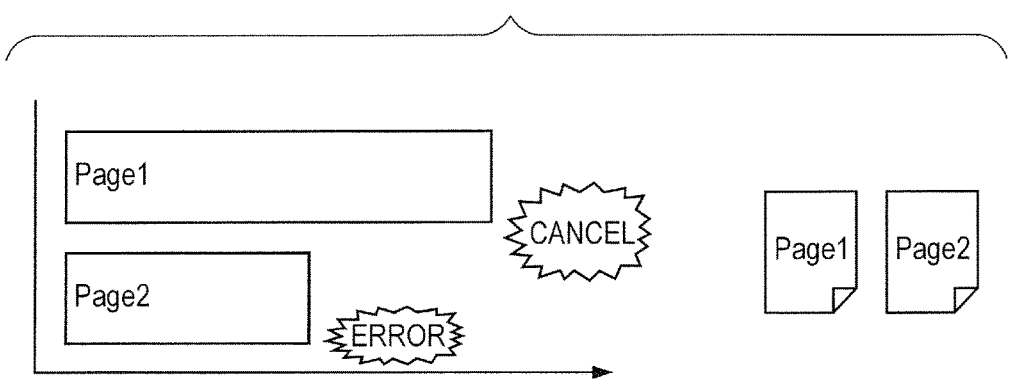

FIGS. 7A to 7C are views illustrating one example of the processing which prints the print data of 2 pages in the present embodiment. When there is the error in the second page, ordinarily, the error is immediately notified to the control unit 201, as in FIG. 7A (S416), and analysis processing for pages 1 and 2 is canceled. As a result, cancel processing is executed more quickly than that in a conventional printing apparatus (FIG. 8), and a needless output of the page 1 can also be suppressed.

Figure 8:
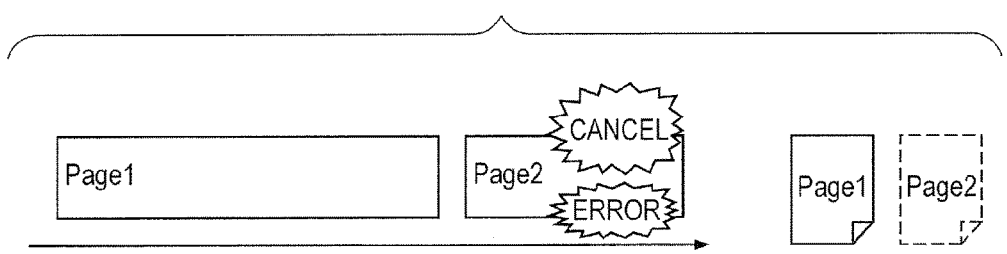
FIG. 8 is a view illustrating one example of the processing which prints the print data of 2 pages in a conventional printing apparatus.

When the conventional mode is turned ON or the print data is the PS, the error is notified to the control unit 201 after the page 1 has been printed, as in FIG. 7B (S413 and S415). As a result, the page 1 is output, and the page 2 is not output. In this case, the output result becomes the same as that of the conventional printing apparatus (FIG. 8).

In addition, when there is the error after the final page of the print data, the cancel processing is performed after the final page has been printed, as in FIG. 7C (S411), and the user can obtain the print result of the pages 1 and 2.

Thus, according to the present embodiment, in the analysis processing of the print data, to which the multi-core is applied, the optimal cancel can be performed according to a situation in which the error has occurred.

Embodiment 2

The processing of the analyzing units 203a and 203b is the same as that in FIG. 3 in Embodiment 1, and accordingly the description will be omitted.

Figure 9:
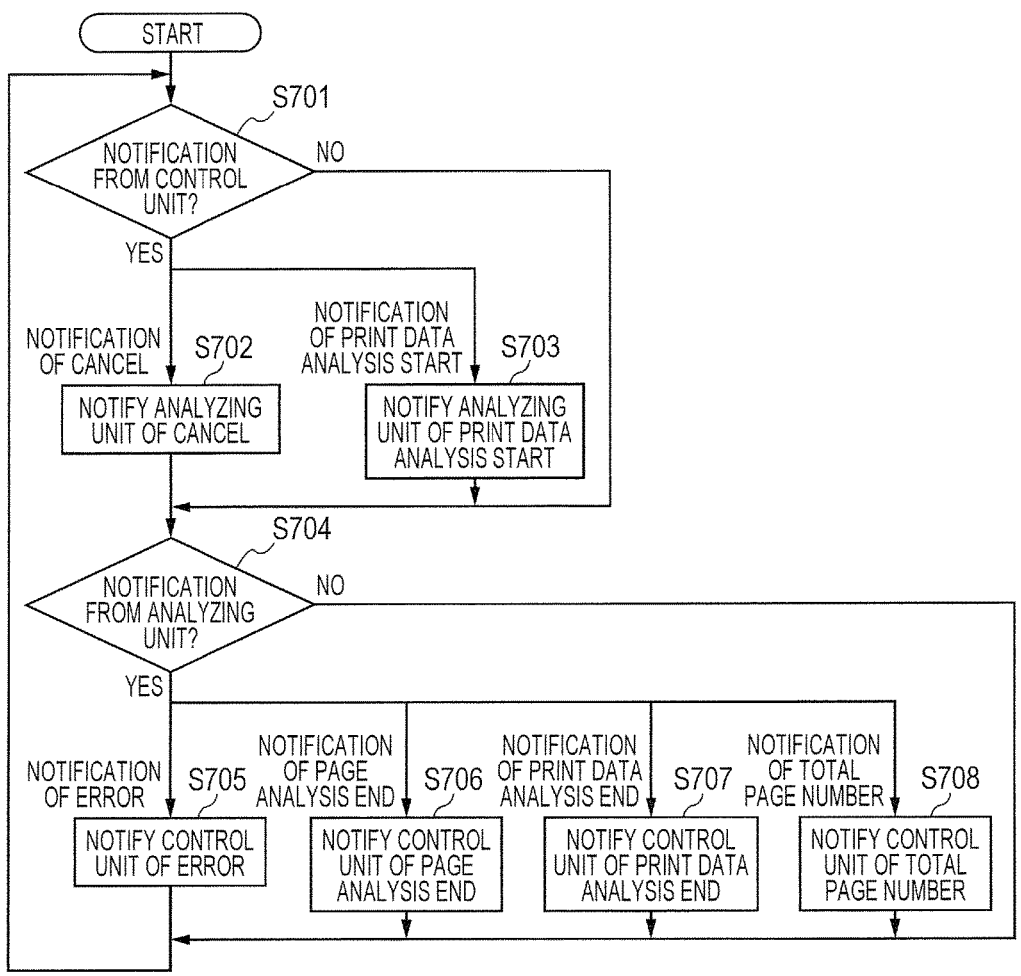
FIG. 9 is a flow chart which illustrates the information processing of a notification management unit.

FIG. 9 is a flow chart which illustrates the information processing of the notification management unit 202.

In a step S701, the notification management unit 202 checks whether there is a notification sent from the control unit 201. When there is a notification of cancel, the notification management unit 202 progresses to the processing of a step S702. When there is a notification of a print data analysis start, the notification management unit 202 progresses to the processing of a step S703. In addition, when there is no notification sent from the control unit 201, the notification management unit 202 progresses to the processing of a step S704.

In the step S702, the notification management unit 202 notifies the analyzing units 203a and 203b of the cancel of the analysis processing.

In the step S703, the notification management unit 202 notifies the analyzing units 203a and 203b of the print data analysis start. Incidentally, in the present embodiment, the analyzing unit 203a shall analyze odd pages of the print data, and the analyzing unit 203b shall analyze even pages of the print data.

In the step S704, the notification management unit 202 checks whether there is a notification sent from the analyzing units 203a and/or 203b. When there is a notification of an error, the notification management unit 202 progresses to the processing of a step S705. When there is a notification of a page analysis end, the notification management unit 202 progresses to the processing of a step S706. When there is a notification of a print data analysis end, the notification management unit 202 progresses to the processing of a step S707. When there is a notification of the total page number, the notification management unit 202 progresses to the processing of a step S708. When there is no notification sent from the analyzing units 203a and 203b, the notification management unit 202 returns to the processing of the step S701.

In the step S705, the notification management unit 202 notifies the control unit 201 of the error. In the step S706, the notification management unit 202 notifies the control unit 201 of the page analysis end.

In the step S707, the notification management unit 202 notifies the control unit 201 of the print data analysis end.

In the step S708, the notification management unit 202 notifies the control unit 201 of the value of the total page number.

Figure 10:
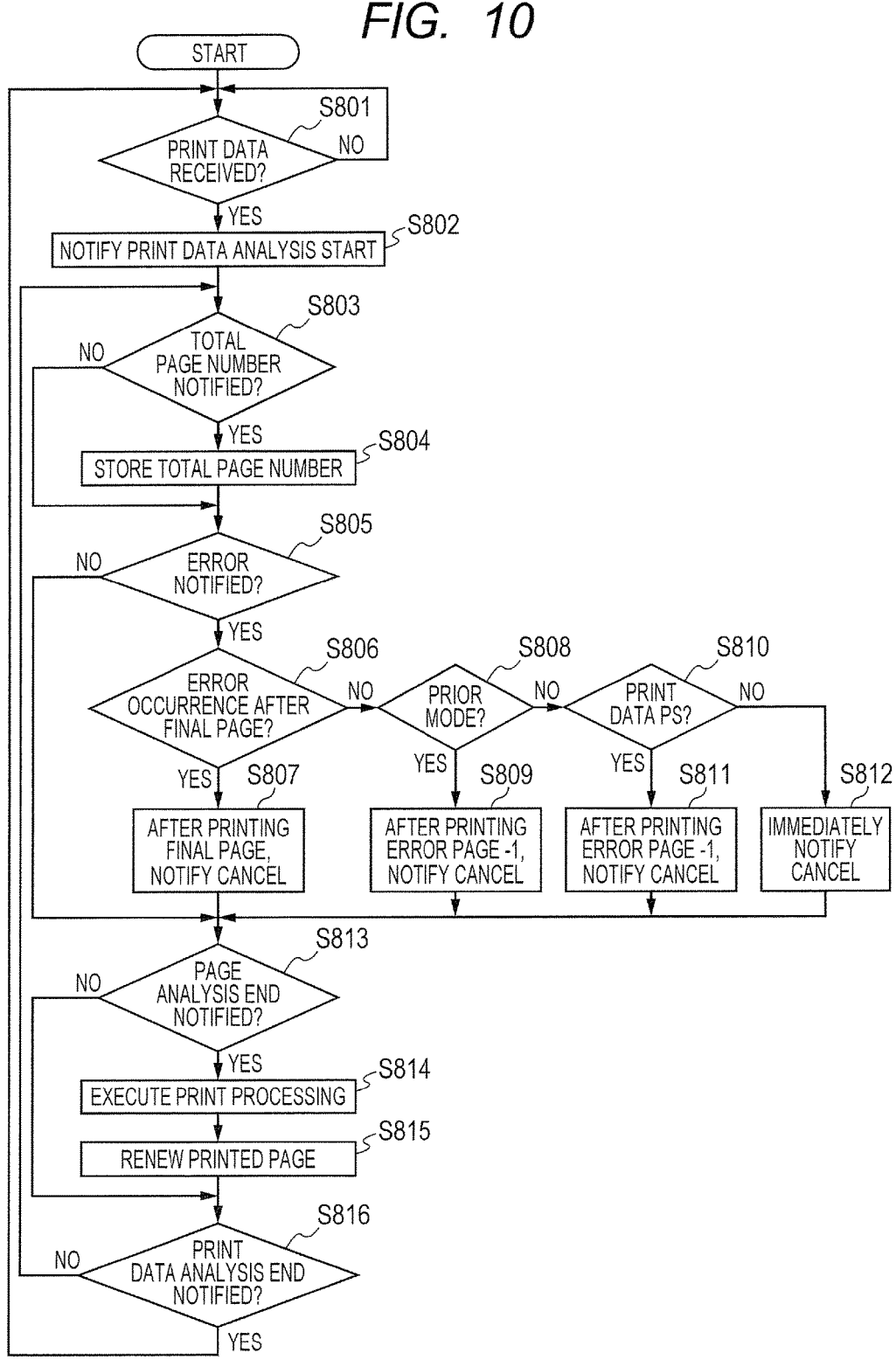
FIG. 10 is a flow chart which illustrates the information processing of a control unit.

FIG. 10 is a flow chart which illustrates the information processing of the control unit 201.

In a step S801, the control unit 201 checks whether having received the print data. When having received the print data, the control unit 201 progresses to the processing of a step S802. When not having received the print data, the control unit 201 repeats the processing of the step S801.

In the step S802, the control unit 201 notifies the notification management unit 202 of the print data analysis start.

In a step S803, the control unit 201 checks whether the notification of the total page number is sent from the notification management unit 202. When the above described notification is sent, the control unit 201 progresses to the processing of a step S804. When the notification is not sent, the control unit 201 progresses to the processing of a step S805.

In the step S804, the control unit 201 stores the value of the total page number therein.

In the step S805, the control unit 201 checks whether error notification is sent from the notification management unit 202. When the error notification is sent, the control unit 201 progresses to the processing of a step S806. When the error notification is not sent, the control unit 201 progresses to the processing of a step S813.

In the step S806, the control unit 201 checks whether the error notification concerns an error having occurred after the final page. When the error notification concerns the error having occurred after the final page, the control unit 201 progresses to the processing of a step S807. When the notification does not concern the error, the control unit 201 progresses to the processing of a step S808.

In the step S807, the control unit 201 notifies the notification management unit of the cancel, after having checked that the final page has been printed.

In the step S808, the control unit 201 checks whether the conventional mode is turned ON or OFF, which the control unit 201 stores in itself. The value for the conventional mode shall be previously designated by a user. When the value for the conventional mode is turned ON, the value for the conventional mode means that the printing apparatus in the present embodiment shall perform the same print processing as that with a conventional single core, and the control unit 201 progresses to the processing of a step S809. When the value is not turned ON, the control unit 201 progresses to the processing of a step S810.

In the step S809, the control unit 201 checks that the page which is one page prior to the error occurring page has been printed, with reference to the value of the printed page, which the control unit 201 stores in itself, and then notifies the notification management unit 202 of the cancel.

In the step S810, the control unit 201 checks the kind of the print data for which the analysis processing is being performed. When the print data is PS, the control unit 201 progresses to the processing of a step S811. When the print data is not the PS, the control unit 201 progresses to the processing of a step S812.

In the step S811, the control unit 201 checks that the page which is one page prior to the error occurring page has been printed, with reference to the value of the printed page, which the control unit 201 stores in itself, and then notifies the notification management unit 202 of the cancel.

In the step S812, the control unit 201 notifies the notification management unit 202 of the cancel, immediately without a pause.

In a step S813, the control unit 201 checks whether a notification of a page analysis end is sent from the notification management unit 202. When the notification is sent, the control unit 201 progresses to the processing of a step S814. When the notification is not sent, the control unit 201 progresses to the processing of a step S816.

In the step S814, the control unit 201 executes the print processing for the page of which the page analysis end has been notified.

In a step S815, the control unit 201 renews a value of the printed page, which the control unit 201 stores in itself.

In the step S816, the control unit 201 checks whether a notification of a print data analysis end is sent from the notification management unit 202. When the notification is sent, the control unit 201 progresses to the processing of the step S801. When the notification is not sent, the control unit 201 progresses to the processing of the step S803.

Also in the present embodiment, similarly to Embodiment 1, in the analysis processing of the print data, to which the multi-core is applied, the optimal cancel can be performed according to a situation in which the error has occurred.

Furthermore, in the present embodiment, the processing of the notification management unit 202 is reduced to only the notification of the error occurring between the control unit 201 and the analyzing units 203a and 203b, and the notification of the cancel; and the processing which has been performed by the notification management unit 202 in Embodiment 1 is shifted to the control unit 201. Because of this, though the control unit 201 in Embodiment 1 does not know that there is a plurality of analyzing units, the control unit 201 in the present embodiment knows that there is the plurality of analyzing units, and it is facilitated to introduce the control which is specialized in the multi-core, into the control unit 201.

Embodiment 3

Figure 11:
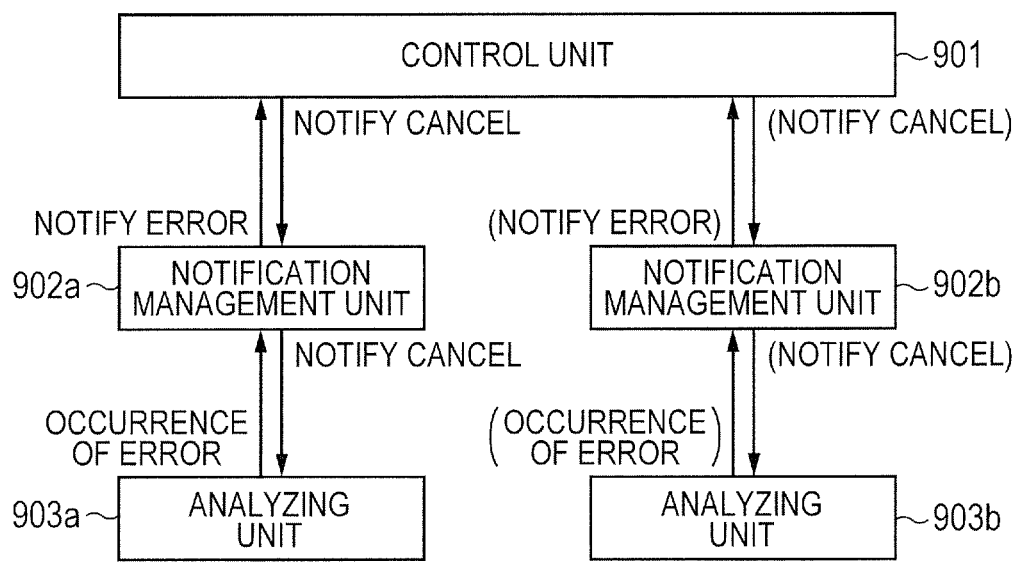
FIG. 11 is a view illustrating a software configuration for analyzing the print data of the printing apparatus.

FIG. 11 is a view illustrating one example of a software configuration for analyzing the print data of the printing apparatus.

A control unit 901 controls the whole print processing in a period after having received the print data until printing the print data.

A notification management unit 902a is positioned between the control unit 901 and an analyzing unit 903a, and acts as a liaison between the units. The notification management unit 902a detects an error occurring in the analyzing unit 903a, and notifies the control unit 901 of the error. In addition, the notification management unit 902a notifies the analyzing unit 903a of a cancel notification which the control unit 901 outputs after having received the error notification. The relationship among the control unit 901, the notification management unit 902b and the analyzing unit 903b is the same as the relationship among the control unit 901, the notification management unit 902a and the analyzing unit 903a.

The analyzing units 903a and 903b analyze the print data. When having received the cancel notification, the analyzing units 903a and 903b stop analysis processing.

Cancel processing in the case where the error has occurred during an analysis of the print data, in such a software configuration, will be described below with reference to flow charts in FIGS. 12 and 13. Incidentally, the processing of the analyzing units 903a and 903b is the same as that in FIG. 3 in Embodiment 1, and accordingly the processing will be omitted here.

Figure 12:
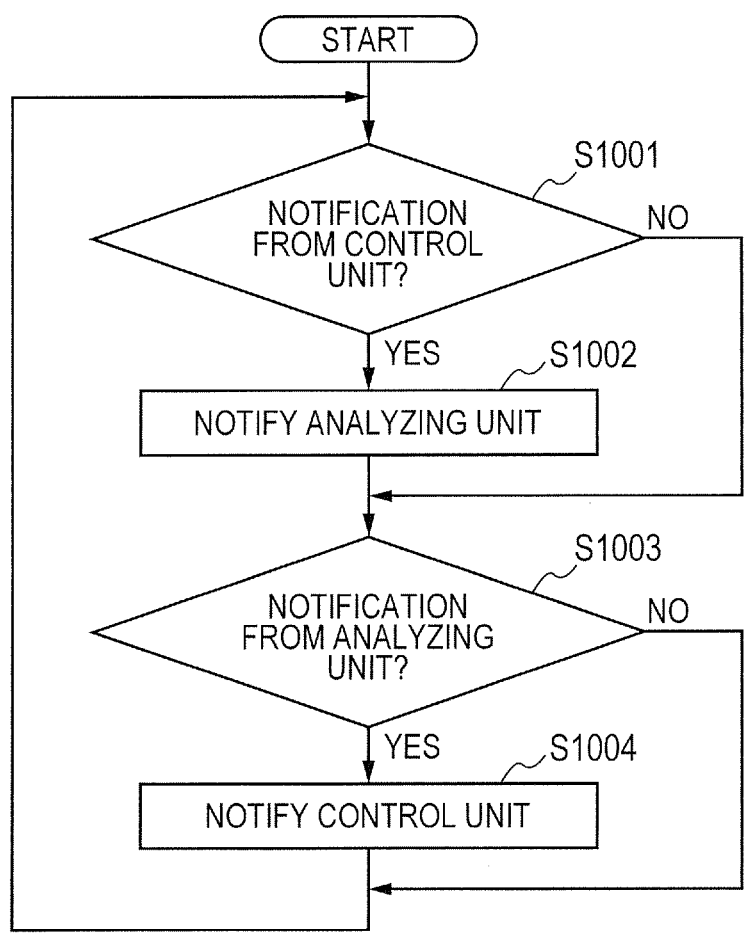
FIG. 12 is a flow chart which illustrates the information processing of a notification management unit.

FIG. 12 is a flow chart which illustrates the information processing of the notification management unit 902a. Here, the processing of the notification management unit 902a will be described, but a notification management unit 902b also performs the same processing as that of the notification management unit 902a.

In a step S1001, the notification management unit 902a checks whether there is a notification sent from the control unit 901. When there is the notification, the notification management unit 902a progresses to the processing of a step S1002. When there is not the notification, the notification management unit 902a progresses to the processing of a step S1003.

In the step S1002, the notification management unit 902a notifies the analyzing unit 903a of the notification sent from the control unit 901 as it is.

In the step S1003, the notification management unit 902a checks whether there is a notification sent from the analyzing unit 903a. When there is the notification, the notification management unit 902a progresses to the processing of a step S1004. When there is not the notification, the notification management unit 902a progresses to the processing of the step S1001.

In the step S1004, the notification management unit 902a notifies the control unit 901 of the notification sent from the analyzing unit 903a as it is.

Figure 13:
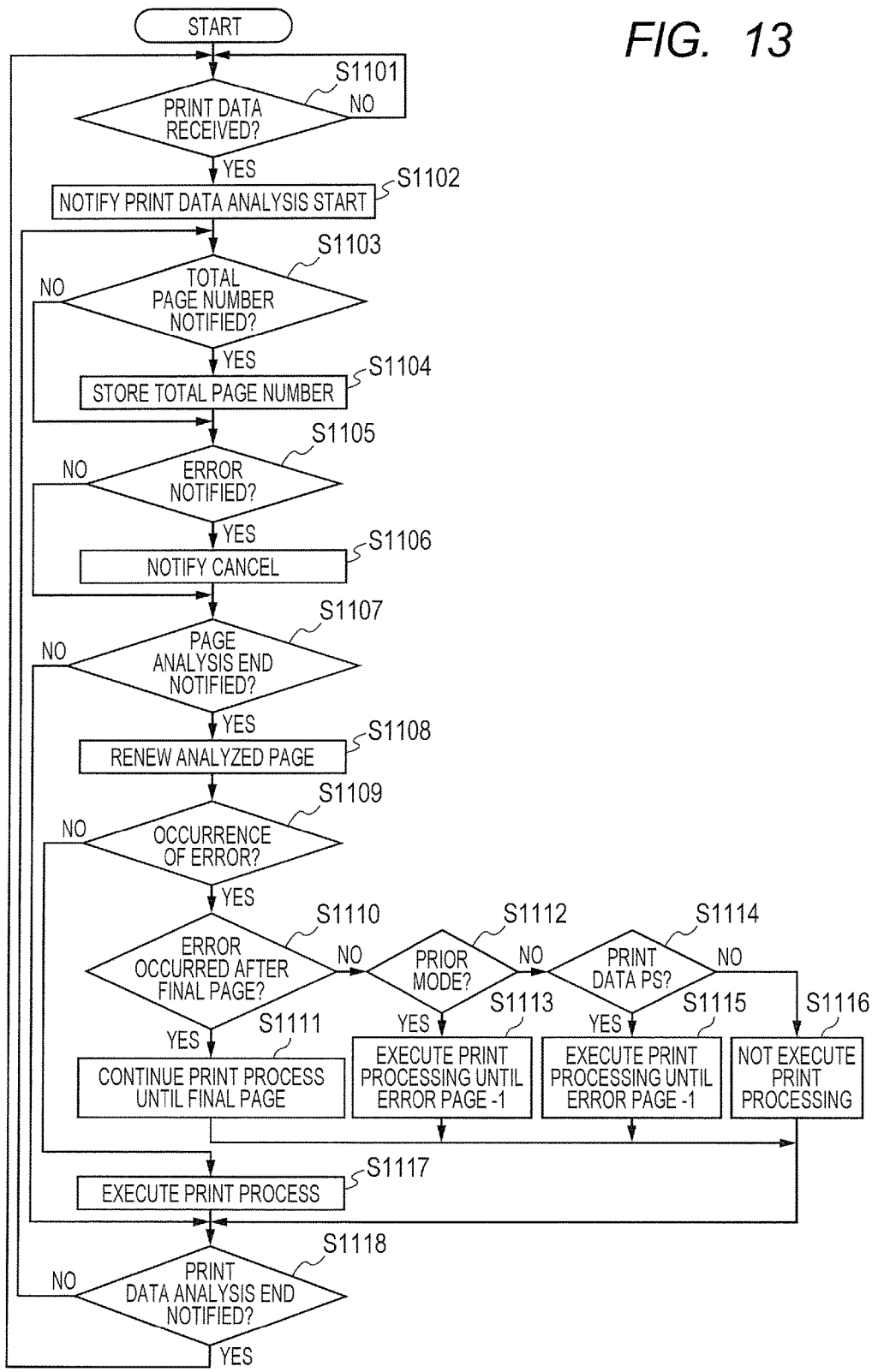
FIG. 13 is a flow chart which illustrates the information processing of a control unit.

FIG. 13 is a flow chart which illustrates the information processing of the control unit 901.

In a step S1101, the control unit 901 checks whether having received the print data. When having received the print data, the control unit 901 progresses to the processing of a step S1102. When not having received the print data, the control unit 901 repeats the processing of the step S1101.

In the step S1102, the control unit 901 notifies the notification management units 902a and 902b of a print data analysis start. As has been described in the step S1002 in FIG. 12, the notification management units 902a and 902b which have received the notification notify the analyzing units 903a and 903b of the print data analysis start, respectively. Incidentally, in the present embodiment, the analyzing unit 903a shall analyze odd pages of the print data, and the analyzing unit 903b shall analyze even pages of the print data.

In a step S1103, the control unit 901 checks whether the notification of the total page number is sent from the notification management units 902a and/or 902b. When the notification of the total page number is sent, the control unit 901 progresses to the processing of a step S1104. When the notification is not sent, the control unit 901 progresses to the processing of a step S1105.

In the step S1104, the control unit 901 stores the value of the total page number therein.

In the step S1105, the control unit 901 checks whether error notification is sent from the notification management units 902a and/or 902b. When the error notification is sent, the control unit 901 progresses to the processing of a step S1106. When the error notification is not sent, the control unit 901 progresses to the processing of a step S1107.

In the step S1106, the control unit 901 notifies the notification management unit 902 of the cancel, which has sent the error notification.

In the step S1107, the control unit 901 checks whether a notification of a page analysis end is sent from the notification management units 902a and/or 902b. When the notification of the page analysis end is sent, the control unit 901 progresses to the processing of a step S1108. When the notification of the page analysis end is not sent, the control unit 901 progresses to the processing of a step S1118.

In the step S1108, the control unit 901 renews a value of the analyzed page, which the control unit 901 stores in itself.

In a step S1109, the control unit 901 checks whether the error has occurred in the analyzing units 903a and/or 903b. When the error has occurred, the control unit 901 progresses to the processing of a step S1110. When the error has not occurred, the control unit 901 progresses to the processing of a step S1117.

In the step S1110, the control unit 901 checks whether the error concerns an error having occurred after the final page. When the error concerns the error having occurred after the final page, the control unit 901 progresses to the processing of a step S1111. When the error does not concern the error, the control unit 901 progresses to the processing of a step S1112.

In the step S1111, the control unit 901 performs print processing for all pages to the final page.

In the step S1112, the control unit 901 checks whether the conventional mode is turned ON or OFF, which the control unit 901 stores in itself. In the present embodiment, a value for the conventional mode shall be previously designated by a user. When the value for the conventional mode is turned ON, the value for the conventional mode means that the printing apparatus in the present embodiment shall perform the same print processing as that with a conventional single core, and the control unit 901 progresses to the processing of a step S1113. When the value is not turned ON, the control unit 901 progresses to the processing of a step S1114.

In the step S1113, the control unit 901 executes the print processing for all pages to the page which is one page prior to the error occurring page, with reference to the value of the printed page, which the control unit 901 stores in itself.

In the step S1114, the control unit 901 checks the kind of the print data for which the analysis processing is being performed. When the print data is the PS, the control unit 901 progresses to the processing of a step S1115. When the print data is not the PS, the control unit 901 progresses to the processing of a step S1116.

In the step S1115, the control unit 901 executes the print processing for all pages to the page which is one page prior to the error occurring page, with reference to the value of the printed page, which the control unit 901 stores in itself.

In the step S1116, the control unit 901 does not execute the print processing for the error occurring page.

In a step S1117, the control unit 901 executes the print processing for the page of which the analysis has been ended.

In a step S1118, the control unit 901 checks whether a notification of a print data analysis end is sent from the notification management units 902a and/or 902b. When the notification is sent, the control unit 901 returns to the processing of the step S1101, and waits for the reception of the next print data. When the notification is not sent, the control unit 901 returns to the processing of the step S1103, and continues the analysis of the print data.

Also in the present embodiment, similarly to Embodiments 1 and 2, in the analysis processing of the print data, to which the multi-core is applied, the optimal cancel can be performed according to a situation in which the error has occurred.

In the present embodiment, both of the notification management unit and the analyzing unit correspond to the multi-core, and accordingly such an expansion is further facilitated as to increase the number of the analyzing units according to the core number of the multi-core CPU.

As has been described above, each of the above described embodiments can perform appropriate processing according to an error, even when a plurality of analyzing units has been applied to the analysis processing of the print data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-150710, filed Jul. 24, 2014, which is hereby incorporated by reference herein in its entirety.

What is claimed is:
1. A printing apparatus comprising:
a memory configured to store a program; and
a multi-core processor configured to execute the program to function as:
first and second analyzing units configured to analyze print data of a plurality of pages, wherein each of the analyzing units is capable of analyzing, in parallel to analyzing of pages by the other analyzing unit, a page different from the pages analyzed by the other analyzing unit; and
a control unit configured to control the first and second analyzing units,
wherein, the control unit controls the first and second analyzing units, in a case of an analysis error occurring in analyzing one page among the plurality of pages by the first analyzing unit, even if an analysis of the plurality of pages is suspended due to the analysis error, in order to enable image output of all pages preceding the one page,
wherein, in the case, the first analyzing unit stops immediately the analyzing of the one page,
the second analyzing unit is controlled to either continue analyzing another page if it is a page preceding the one page until completing the analyzing of the another page, or stop analyzing the another page if it is a page succeeding the one page in response to the suspension of the analysis.

2. The printing apparatus according to claim 1, wherein, in the case, the first analyzing unit and the second analyzing unit analyze the one page and the another page or pages, partially in parallel.

3. The printing apparatus according to claim 1, wherein the second analyzing unit analyzes none of pages following the one page.

4. The printing apparatus according to claim 1, wherein the print data is described by a predetermined page description language.

5. The printing apparatus according to claim 1, wherein the analyzing error occurs due to data not supported by the first analyzing unit being included in the one page.

6. The printing apparatus according to claim 1, wherein, in the case, the first and second analyzing units complete analyzing at least all of page or pages including the another page or pages preceding the one page.

7. An image processing apparatus comprising:
a plurality of processors including at least a first processor and a second processor configured to execute an analyzing process for analyzing print data, and to suspend the analyzing process based on detecting an error during analyzing of the print data, and
a control unit configured to control the first and second processors,
wherein, in the analyzing process, the first processor analyzes at least first page data contained in the print data, and the second processor analyzes at least second page data contained in the print data,
wherein, when the error is detected in the second page data before completing the analyzing of the first page data, the first processor is controlled to complete analyzing of the first page data, and
when the error is detected in the first page data before completing analyzing of the second page data, the second processor is controlled to immediately stop analyzing of the second page data.

8. The image processing apparatus according to claim 7, wherein the first processor continues analyzing until completing analyzing the first page data even in a case of detecting the error in the second page data, to enable data output based on a result of analyzing the first page data.

9. The image processing apparatus according to claim 7, wherein the first processor continues analyzing until completing analyzing the first page data even in a case of detecting the error in the second page data, to enable image output based on a result of analyzing the first page data.

10. The image processing apparatus according to claim 7, wherein the first processor continues analyzing until completing analyzing the first page data even in a case of detecting the error in the second page data, to enable printing based on a result of analyzing the first page data.

11. The image processing apparatus according to claim 7, wherein the image processing apparatus determines whether or not the print data is a particular print data, and
when the print data is determined as the particular print data, even in a case that the error is detected in the second page data before completing the analyzing of the first page data, the analyzing by the first processor continues until completing the analyzing of the first page data.

12. The image processing apparatus according to claim 11, wherein the print data is postscript print data.

13. The image processing apparatus according to claim 7, wherein, in another analyzing process for other print data, the first processor analyzes a third page data contained in the other print data,
wherein, in the another analyzing process, the second processor analyzes a fourth page data contained in the other print data, and
wherein, when the error is detected in the fourth page data before completing the analyzing of the third page data in the other analyzing process, the first processor continues analyzing the third page data.

14. The image processing apparatus according to claim 7, wherein the second processor stops the analyzing of the second page data in relation to the error is detected in the second page of data.

15. The image processing apparatus according to claim 7, wherein the control unit instructs the first processor to stop analyzing after completing the analyzing of the first page data based on a notification of the error from the second processor.

16. The image processing apparatus according to claim 7, further comprising a printing unit configured to print an image, based on an analyzing result of the page data contained in the print data by the plurality of processors.

17. The image processing apparatus according to claim 7, wherein the plurality of processors form a multi-core processor.

18. The image processing apparatus according to claim 7, wherein the first page data is a page data preceding the second page data within data of a plurality of pages.

19. The image processing apparatus according to claim 7, wherein, when the error in the second page data is detected by the second processor, the plurality of processors continue the analyzing until completing the analyzing of all pages preceding the second page within data of a plurality of pages.

20. An image processing method for use in an image processing apparatus comprising a plurality of processors including at least a first processor and a second processor configured to execute an analyzing process for analyzing print data, and to suspend the analyzing process based on detecting an error during analyzing the print data, wherein the method comprises:
analyzing first page data contained in the print data by the first processor; and
analyzing second page data contained in the print data by the second processor, wherein
when the error is detected in the second page data before completing the analyzing of the first page data, stopping the analyzing by the first processor after completing the analyzing of the first page data; and
when the error is detected in the first page data before completing the analyzing of the second page data, the analyzing of the second page data is immediately stopped.

* * * * *